United States Patent [19]
May et al.

[11] Patent Number: 5,640,267
[45] Date of Patent: Jun. 17, 1997

[54] OPTICAL APPARATUS

[75] Inventors: Paul May, Cambridge; Gillian Margaret Davis, Oxfordshire, both of United Kingdom

[73] Assignee: Sharp Kabushiki Kaisha, Osaka, Japan

[21] Appl. No.: 396,633

[22] Filed: Mar. 1, 1995

[30] Foreign Application Priority Data

Mar. 2, 1994 [GB] United Kingdom ............ 9404001

[51] Int. Cl.$^6$ ..................................... G02F 1/00
[52] U.S. Cl. .............. 359/322; 359/296; 359/254; 359/256; 385/3; 349/196
[58] Field of Search ................. 359/36, 39, 291, 359/296, 279, 322, 323, 326, 53, 249, 247, 251, 254, 256, 257, 258, 259; 385/3, 4, 9; 365/145

[56] References Cited

U.S. PATENT DOCUMENTS

| | | | |
|---|---|---|---|
| 3,814,502 | 6/1974 | Barkley | 359/322 |
| 3,819,248 | 6/1974 | Takeda et al. | 350/3.5 |
| 3,832,033 | 8/1974 | Furuhata et al. | 350/160 LC |
| 3,838,906 | 10/1974 | Kumada | 359/322 |
| 3,936,146 | 2/1976 | Kumada et al. | 359/322 |
| 4,085,576 | 4/1978 | Deverin | 359/322 |
| 4,576,441 | 3/1986 | Kubick | 350/355 |
| 4,615,588 | 10/1986 | Goldhar et al. | 359/258 |
| 5,264,951 | 11/1993 | Takanashi et al. | 359/53 |
| 5,278,924 | 1/1994 | Schaffner | 385/3 |
| 5,305,136 | 4/1994 | Smith | 359/247 |
| 5,317,446 | 5/1994 | Mir et al. | 359/296 |
| 5,349,466 | 9/1994 | Delacourt et al. | 359/326 |

FOREIGN PATENT DOCUMENTS

| | | |
|---|---|---|
| 0486769 | 5/1992 | European Pat. Off. . |
| 0546891 | 6/1993 | European Pat. Off. . |
| 0558801 | 9/1993 | European Pat. Off. . |
| 1024330 | 3/1966 | United Kingdom . |
| 2173605 | 10/1986 | United Kingdom . |

OTHER PUBLICATIONS

Search Report for British Appl. 9404001.1, dated May 31, 1994.
Yamamoto, "Quasi–Phase–Matched Second Harmonic Generation in a LiTaO$_3$ Waveguide", IEEE Journal of Quantum Electronics, vol. 28, No. 9, Sep. 1992, pp. 1909–1914.
Search Report for European Appl. 95301319.0, mailed Sep. 4, 1995.
Yoshino et al, "Characteristics of Ferroelectric Liquid Crystal Sandwiched Between Drawn and Poled Polyvinylidene Fluoride Thin Films," Japanese Journal of Applied Physics, vol. 27, No. 2, Feb. 1988, pp. L129–L131.
Furuhata et al, "New Liquid–Crystal Method for Revealing Ferroelectric Domains," Appl. Phys. Lett., vol. 23, No. 7, Oct. 1, 1973, pp. 361–362.
Balakshii et al, "Amplitude Modulation of Light by Diffraction on Ba$_2$ . . . " Sov. J. quantum Electron, 8(9), Sep. 1978, pp. 1078–1081.
Guo et al, "Wide Sideband Generation by Quasi–Velocity–Matched Electro–optic Modulator . . . ", SPIE, vol. 2150/ 243–246, (Jan. 24, 1994).
Sueta et al, "High Speed Guided–Wave Optical Modulators", Journal of Optical Communications, vol. 3, (1982), Jun., No. 2, Berlin, pp. 52–58.
Search Report for European Appl. 95301319.0, mailed Jun. 26, 1995.
Mataki, "Low Voltage Optical Modulator Using Electrooptically Induced Phase Gratings", Applied Optics, vol. 12, No. 7, Jul., 1973, pp. 1472–1476.

*Primary Examiner*—Loha Ben

[57] ABSTRACT

An electro-optic material has first and second regions formed therein. The optic axes of the first and second regions are antiparallel and define a domain inversion pattern. The difference in refractive index between the first and second regions is a function of an electric field applied thereto. The difference in refractive index enables spatial light phase modulators and refractive optical devices having electrical control to be formed.

26 Claims, 3 Drawing Sheets

OPTICAL APPARATUS

The present invention relates to an optical apparatus. Such an apparatus is suited for use as a spatial light phase modulator or as an electrically controllable refractive or reflective optic device.

Such devices are suited, amongst other things, for use in optical computing, data storage and beam steering applications.

GB 2173605 and EP 0486769 both disclose optical devices which comprise a pair of elements having their optic axes arranged in different directions. GB 2173605 further describes providing a pair of electrodes in order to apply an electric field to the elements in order to control an optical condition of at least one of the first and second elements, for example, where electro-optic materials are used, to control the refractive indices thereof. The use of a single layer of liquid crystal material is also disclosed. In the GB 2173605 disclosure, in each embodiment in which electro-optic materials are used the device comprises two separate elements, each of which is etched in a periodic pattern.

According to a first aspect of the present invention, there is provided an optical apparatus comprising an electro-optic material having at least one first region having a crystal axis along a first direction, at least one second region having a crystal axis along a second direction, and means for applying an electric field across the at least one first region and the at least one second region to vary the refractive indices thereof without altering the directions of the crystal axes.

It is thus possible to vary refractive indices of the first and second regions with respect to one another. Variations in the refractive indices allow the relative travel times of light propagation through the first and second regions to be varied, thereby allowing controllable phase shifts to be introduced. Additionally, optical elements, such as lenses, utilizing refractive optics can be fabricated since such devices require a refractive index change across a boundary. The refractive index change is electrically controllable and hence the properties of such devices are electrically controllable. Furthermore, periodic structures having alternating regions of different refractive indices can be used to form reflection gratings, transmission gratings and Bragg reflectors. The refractive indices of the first and second regions may be controlled to switch such devices on and off and to control their operating characteristics. Thus the provision of electro-optic material having spatially varying electro-optic domains can be used in a variety of optical applications.

Furthermore, the properties of the device rely only on the pattern of the first and second regions and not on having to form complex electrode patterns. Thus the need to provide patterned electrodes is avoided.

Preferably the first direction makes an angle of 180 degrees with respect to the second direction. Thus the directions are parallel but opposite and may be described as being anti-parallel. The term "anti-parallel" will be used herein to describe lines or directions which are parallel and opposite. The term "parallel" will be used herein to describe lines which make angles of zero and 180 degrees with respect to one another. Thus anti-parallel is to be construed as a special case of parallel. The regions thus form inverted and non-inverted domains.

Preferably the electro-optic material is planar (i.e. a sheet of material, though not necessarily restricted to lying in a geometrical plane).

Advantageously the means for applying the electric field is arranged to apply a field which is parallel to the first direction. For example, electrodes may be formed on either side of a sheet of electro-optic material, thereby allowing relatively large voltage gradients to be applied to the material. The optic axes of the first and second regions may be perpendicular to the plane of the sheet and anti-parallel with each other. In use, light may be arranged to propagate perpendicularly to the sheet of electro-optic material such that the first and second regions are optically in parallel. It is thus possible to form an electrically controllable spatial phase modulator. Such a spatial phase modulator may be used, for example, to form a phase grating or a phase plate.

In an alternative arrangement, the first and second regions may be optically in series. For example, a planar device comprising a planar first region may have a plurality of second regions formed therein such that the second regions do not extend completely through the first region. Thus light propagating perpendicular to the plane of the device will pass through an interface between the first and second regions. Suitable profiling of the interface can be used to form lenses, lenticles, prisms and other elements relying on refraction. Complex elements, such as Fresnel lenses, may be formed by cooperation of the individual interfaces. Since the focal length of a lens depends, amongst other things, on the change of refractive index across an interface between two materials, it is thus possible to form lenses whose focal lengths are electrically controllable. The first and second regions are interchangeable.

As a further alternative, the first and second regions may be arranged in series in an alternating periodic fashion. The regions are thus controllable to act as a grating and may, for example, form a distributed Bragg reflector and hence may be controlled to reflect light preferentially at a first wavelength, the strength of reflection being a function of the voltage applied across the first and second regions.

Preferably the first and second regions have substantially equal refractive indices in the absence of an applied electric field. Thus the optical device, be it a spatial phase modulator, a phase plate, a beam steering device, a lens or array of lenses or a grating, will not be optically active when no potential difference exists across the electro-optic material.

Advantageously the electro-optic material may be provided as one wall on a liquid crystal cell. Thus a liquid crystal cell, such as a ferroelectric liquid crystal (FLC) Cell, would have the liquid crystal aligning in a spatially varying pattern in accordance with the pattern of first and second regions formed in the electro-optic device.

The present invention will further be described, by way of example, with reference to the accompanying drawings, in which.

Figure 1:
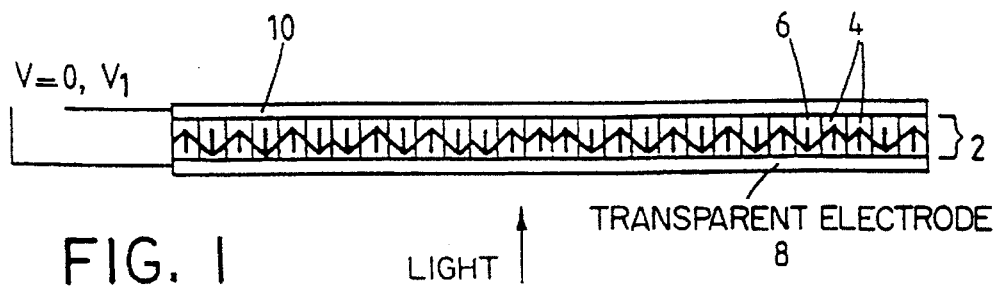
FIG. 1 is a schematic diagram of a spatial light phase modulator constituting a first embodiment of the present invention.

FIG. 1 shows a spatial light phase modulator comprising a layer of electro-optic material, indicated generally as 2, having a plurality of first and second regions 4 and 6, respectively, formed therein. Substantially transparent first and second electrodes 8 and 10 are formed on opposite sides of the layer 2. The electrodes 8 and 10 are planar sheets and may be formed of indium-tin oxide. The electrodes 8 and 10 may be translucent or transparent.

The first regions 4 have optic axes pointing from the first electrode 8 towards the second electrode 10, whereas the second regions 6 have optic axes pointing from the second electrode 10 towards the first electrode 8. Thus the regions cooperate to define a domain inversion pattern, i.e. a pattern formed by the anti-parallel domains, formed within the electro-optic material 2.

Many methods exist to create a spatially varying domain structure, i.e. a domain inversion pattern, within the electro-optic material 2. These include direct field reversal (polarising), electron beam written inversion, ion exchange reversal and optically written domains through internal fields induced by charge separation in photorefractive materials. Ion exchange in non-centrosymmetric crystals may be used to lower the Curie temperature for domain inversion along the optic axis in ion exchanged regions of the electro-optic material 2. Thus lithographically defined domain inversion may be performed to create the domain inversion pattern. Fabrication of a domain inversion pattern is described in a paper entitled "Quasi-phase-matched second harmonic generation in a $LiTaO_3$ waveguide" Kazuhisa Yamamoto, Kiminori Mizuuchi and Tetsuo Taniuchi, IEEE journal of quantum electronics, vol 28, no 9, September 1992. Variations in refractive index formed between ion exchanged and non-ion exchanged regions may be reduced or removed by annealing. Direct writing of inverted domains using electron beam lithography has the advantage of avoiding the changes in refractive index associated with ion exchange techniques and also allows relatively deep inverted regions to be formed. For example, lithium niobate substrates 1 mm thick have been completely inverted by electron beam writing of one surface of the substrate.

Assuming that the refractive indices of the regions 4 and 6 are the same, there is no discernable optical difference for light travelling in the first regions 4 compared to light travelling in the second regions 6. However, when the regions 4 and 6 are subjected to an electric field, the refractive indices of the regions change and diverge, thereby giving rise to a difference between the refractive index of the first regions and the refractive index of the second regions.

For light incident normal to the plane of the layer of electro-optic material 2, as indicated in FIG. 1, the direction of the polarisation of light is perpendicular to the optic axes of the first and second regions 4 and 6. With the optic axis defined in a conventional manner as along the z axis for an electro-optic material such as lithium tantalate or lithium niobate which has a 3 m type crystal structure, the change in refractive index along the x, y and z crystallographic directions for a field applied along the z direction is given by:

$$\Delta(1/n_x^2) = r_{13} E_z \quad (1a)$$

$$\Delta(1/n_y^2) = r_{23} E_z \quad (1b)$$

$$\Delta(1/n_z^2) = r_{33} E_z \quad (1c)$$

where n represents refractive index, and $r_{p3}$ represent a coupling coefficient between an effect along the p direction where p represents x,y, and z and a field along the z direction.

For this specific case, $r_{13} = r_{23}$ so that the polarisation of the input light is unimportant. The difference in refractive index between the regions 4 and 6 for light incident normal to the plane is given by:

$$|\Delta n| = n_o^3 \cdot r_{13} E_z \quad (2)$$

where $n_o$ represents the refractive index of the electro-optic material with no applied electric field.

Similar equations describing the electro-optic effect can be written for crystals belonging to other crystallographic groups and/or having other orientations.

For a device of the type shown in FIG. 1, fabricated from z-cut lithium niobate 300 microns thick, $r_{13}$ has a value of 8.6 pm/V. With the application of a voltage between the first and second electrodes 8 and 10, a phase difference will occur between light travelling in the first regions 4 and in the second regions 6. For use as an electrically controllable phase grating, for instance in the reproduction of phase holograms, it is desirable that a phase difference of $\pi$ radians can be introduced between the light travelling through the first and second regions. This phase change is produced when the condition $\Delta n l / \lambda = 0.5$ is satisfied, where l is the thickness of the electro-optic material. For $\lambda = 600$ nm, $n_o = 2.3$, and l=300 microns, a field of approximately $10^7$ $Vm^{-1}$ is required. This corresponds to a voltage of approximately 1500 V across the device.

The pattern of the first and second regions 4 and 6 may be arranged to form a phase hologram which is arranged to act as a lens, a beam steering device, Fourier plane filters, a Fresnel type zone lens, or which forms a binary optic device.

Figure 2:
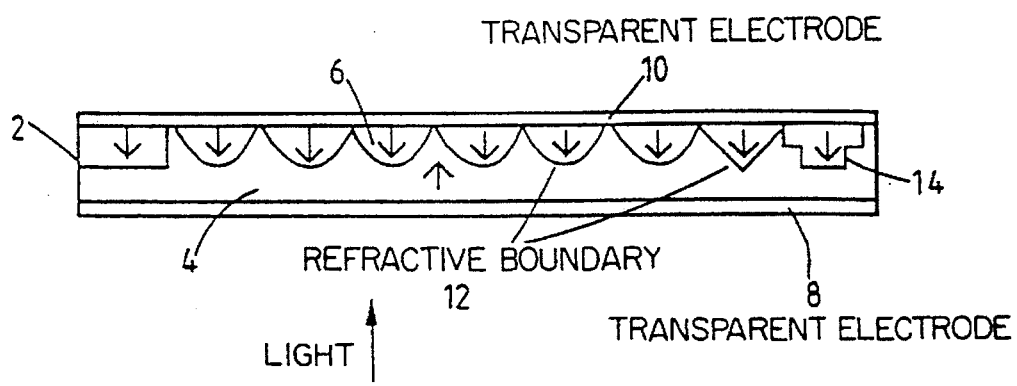
FIG. 2 is a schematic diagram of an electrically controllable lens array constituting a second embodiment of the present invention.

An alternative arrangement is shown in FIG. 2. The first and second regions 4 and 6 are optically in series. A planar first region 4 has a pattern of domain inverted (anti-parallel) second regions 6 formed therein. The second regions 6 have profiled interface regions with the first region, thereby giving rise to a boundary 12 at which refraction occurs. Additionally regions having interfaces 14 which are perpendicular to the direction of propagation of light through the device may be formed to provide phase changes, in a manner similar to that described hereinabove. The refractive boundaries 12 form a microlens array when a potential difference exists between the electrodes 8 and 10. However, other profiles may be formed in order to form other optical elements such as prism or wedge arrays. The first and second regions 4 and 6 may be arranged such that, in the absence of an electric field, the regions have equal refractive indices. Thus the refractive elements are only formed when an electric field is applied. Alternatively the first and second regions 4 and 6 may have different refractive indices (for example due to fabrication using ion exchange processes) such that the refractive interfaces exist in the absence of an electric field and are modified by the application of an electric field. Thus, for instance, the device shown in FIG. 2 may provide a microlens array having a controllable focal length.

Figure 3:
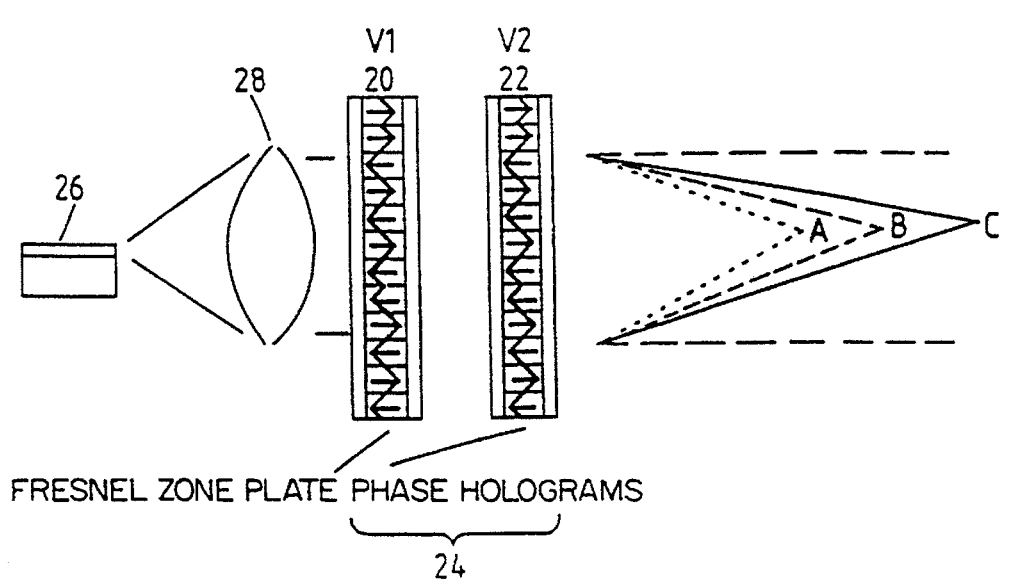
FIG. 3 is a schematic diagram of a beam steering device constituting a third embodiment of the present invention.

FIG. 3 shows a controllable focal length lens comprising two of the devices described with reference to FIG. 1 arranged in series. Each device 20 and 22 is controlled to be either on or off and has a phase grating formed therein arranged to act as a Fresnel lens. Thus the series combination of the devices provides a lens 24 controllable to have any one of four possible focal lengths. Light from a light source 26, such as a laser diode, is collected by a collimating lens 28 and directed towards the controllable lens 24. When both devices 20 and 22 are in an off state, the lens 24 has no effect and the light passes therethrough and remains collimated. Switching on the first device 20 gives the lens 24 a first focal length, and focuses the light to a first point C. Switching on the second device 22 with the first device in an off state gives the lens 24 a second focal length, thereby focusing the light to point B. The lens 24 has a third focal length when both devices 20 and 22 are switched on, thus focusing the light to point A.

Figure 4:
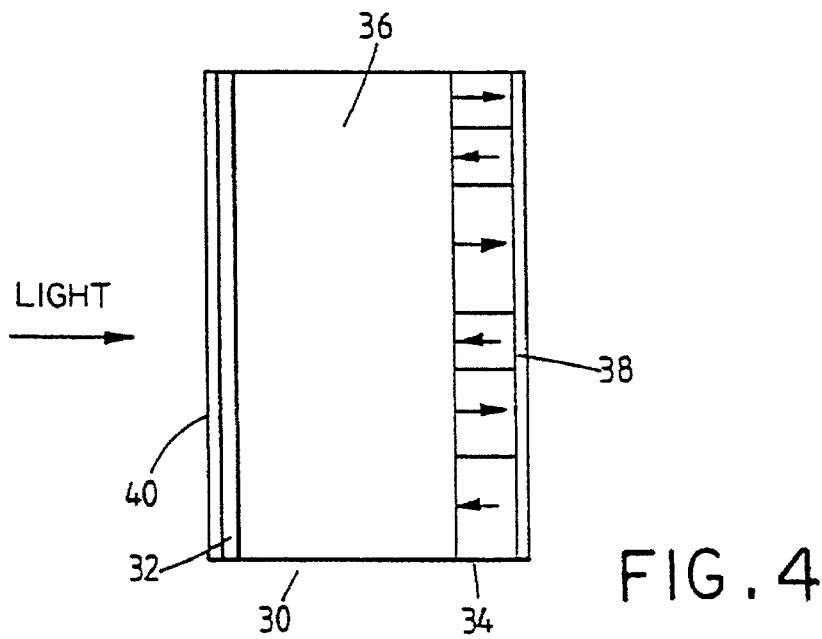
FIG. 4 is a schematic diagram of a spatial light phase modulator constituting a fourth embodiment of the present invention.

The domain inversion effect can be enhanced, thereby allowing thinner slabs of electro-optic material to be used, if the electro-optic material is used to define one wall of a liquid crystal cell, as shown in FIG. 4. A ferroelectric liquid crystal cell 30 having one side formed using conventional aligning film 32 and the other side formed of electro-optic material 34 having a domain inversion pattern formed therein causes the liquid crystal 36 to align in one of two states at the surface of the electro-optic material in accordance with the domain inversion pattern. Application of an electric field across the cell, via transparent electrodes 38 and 40, aligns the liquid crystal 36 with the electric field, and thereby switches off the pattern of phase shifts. Cells of only a few microns thickness and having slabs of electro-optic material patterned to a depth of approximately 1 micron thickness or less are thus able to provide electrically controllable spatial light phase modulatoms.

Figure 5:
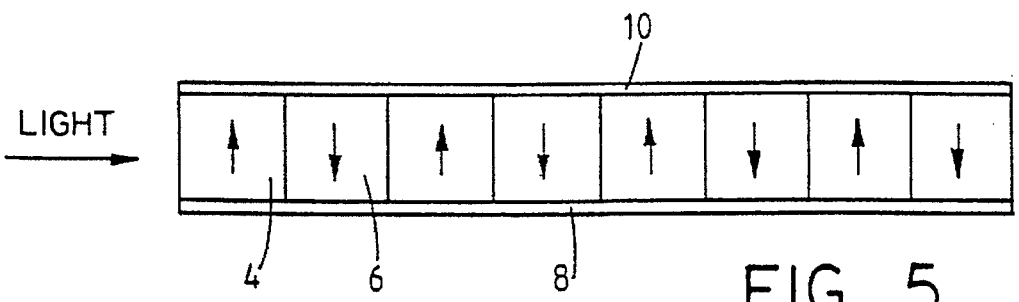
FIG. 5 is a schematic diagram of a grating constituting a fifth embodiment of the present invention.

Additionally the first and second regions 4 and 6 may be regularly; arranged along a direction of light propagation so as to form an electrically controllable grating, as shown in FIG. 5, which can be switched on and off, the strength of the grating being determined by the magnitude of the voltage. Such a grating may be used, for example, to form a distributed Bragg reflector.

Figure 6:
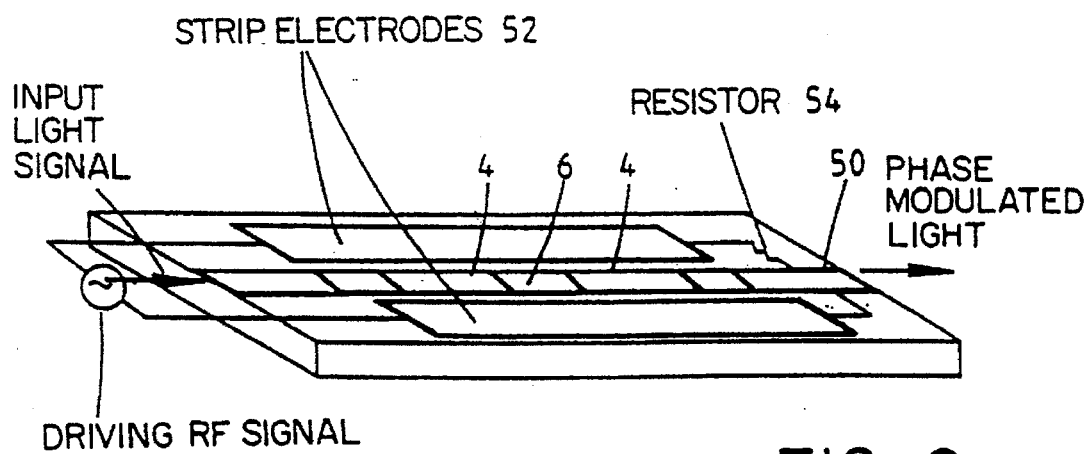
FIG. 6 is a schematic diagram of a phase modulator constituting a sixth embodiment of the invention.

In a further embodiment, the first and second regions 4 and 6 are periodically arranged in series to form a periodically inverted waveguide 50, as shown in FIG. 6. The first and second regions are arranged so as to approximately match the average velocity of propagation of light within the waveguide 50 with the velocity of propagation of electrical signals along strip electrodes 52 formed adjacent the waveguide 50.

In use, an RF signal is supplied to the electrodes 52. The regions 4 and 6 are arranged such that the change from one region to the next occurs when the velocity difference between the electrical and optical signals has resulted in the electrical and optical signals being substantially 180° out of phase.

The amplitude of the RF signal can be varied to control the transit time of the light along the waveguide 50. It is thus possible to use this arrangement as a phase modulator. The electrodes 52 appear electrically as a transmission line and consequently the maximum modulation frequency is not limited by the electrode charging time. The transmission line is terminated by a resistor 54 matched to the characteristic impedance of the line so as to substantially eliminate reflections.

Figure 7:
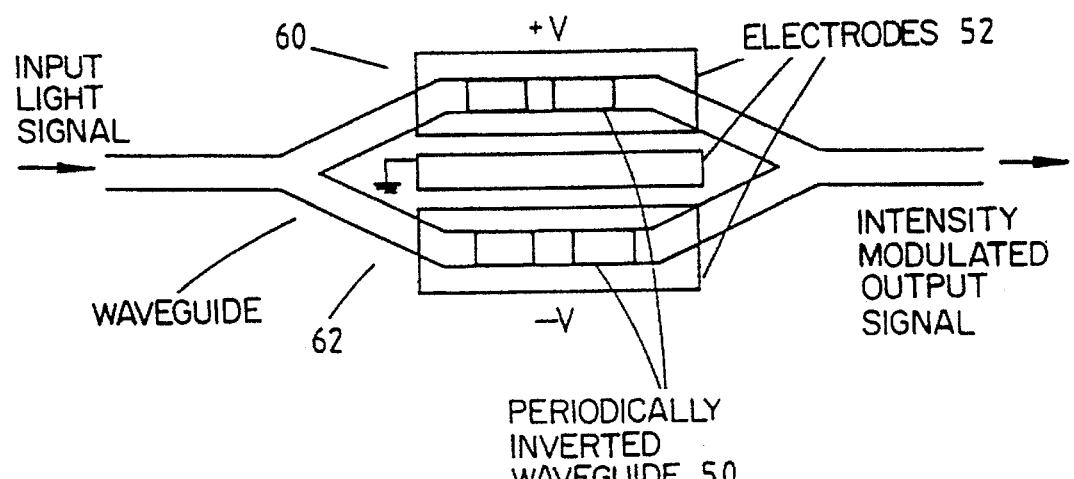
FIG. 7 is a schematic diagram of an interferometer constituting a further embodiment of the invention.

Two phase modulators may be combined so as to form an interferometer, as shown in FIG. 7. Light is divided between first and second paths 60 and 62, each containing a phase modulator. The phase modulators may be controlled so that interference between light travelling along the first and second paths causes the light to be intensity modulated.

It is thus possible to provide a very versatile electrically controllable optical device.

What is claimed is:

1. An optical apparatus comprising an electro-optic material having at least one first region having a crystal axis along a first direction, at least one second region having a crystal axis along a second direction, and means for applying an electric field across the at least one first region and the at least one second region, wherein the means for applying the electric field is arranged to apply the electric field perpendicularly to the first direction.

2. An optical apparatus as claimed in claim 1, wherein the first direction makes an angle of 180° with respect to the second direction.

3. An optical apparatus as claimed in claim 1, wherein the electro-optic material is planar and the first and second directions are perpendicular to the plane of the electro-optic material.

4. An optical apparatus as claimed in claim 1, wherein a direction of light propagation is parallel to the first direction.

5. An optical apparatus as claimed in claim 1, wherein a direction of light propagation is perpendicular to the first direction.

6. An optical apparatus as claimed in claim 1, wherein the means for applying an electric field comprises first and second electrodes.

7. An optical apparatus as claimed in claim 6, wherein the electrodes are formed on opposite surfaces of the electro-optic material.

8. An optical apparatus as claimed in claim 6 wherein the electrodes are translucent.

9. An optical apparatus as claimed in claim 6, wherein the electrodes are transparent.

10. An optical apparatus as claimed in claim 1, wherein the refractive index of the at least one first region is substantially equal to the refractive index of the at least one second region for a first value of the electric field.

11. An optical apparatus as claimed in claim 10, wherein the first value of the electric field is substantially zero.

12. An optical apparatus as claimed in claim 1, wherein a magnitude of a difference in refractive index between the at least one first region and the at least one second region is a function of the electric field.

13. An optical apparatus as claimed in claim 1, wherein the at least one first and the at least one second regions are arranged optically in parallel to provide a spatial phase modulator.

14. An electrically controllable phase plate characterized by an optical apparatus as claimed in claim 13.

15. A phase plate as claimed in claim 14 arranged to introduce a phase difference of ρ radians.

16. An optical apparatus as claimed in claim 1, wherein the electro-optic material is planar and the first and second directions are perpendicular to the plane of the electro-optic material, the at least one first and the at least one second regions are arranged optically in parallel to provide a spatial phase modulator, and the direction of light propagation is substantially perpendicular to the plane of the electro-optic material.

17. An optical apparatus as claimed in claim 1, wherein the at least one first region is optically in series with the at least one second region forming an interface therebetween having a region which is inclined with respect to the direction of propagation of light therethrough.

18. An optical apparatus as claimed in claim 17, wherein the interface forms an electrically controllable lens.

19. A beam steering device comprising an optical apparatus as claimed in claim 17.

20. An electrically controllable refractive index grating comprising an optical apparatus as claimed in claim 1 and a plurality of parallel first regions separated by second regions.

21. An electrically controllable optical phase modulator comprising an optical apparatus as claimed in claim 1, the first and second regions being in series and defining a waveguide.

22. An electrically controllable optical phase modulator as claimed in claim 21, wherein the means for applying an electric field comprises at least one elongate electrode adjacent the waveguide.

23. An electrically controllable optical phase modulator as claimed in claim 22, wherein the first and second regions are arranged to match approximately the average velocity of light propagating along the wave guide with the velocity of propagation of electrical signals along the at least one elongate electrode, in the means for applying an electric field provides the electrical signals to the at least one elongate electrode.

24. An optical intensity modulator comprising first and second optical paths, at least one of the optical paths comprising an electrically controllable optical phase modulator as claimed in claim 21, the light from the first and second paths being arranged to be combined such that the intensity of the combined light at a first wavelength is a function of the phase shift between the first and second optical paths.

25. A liquid crystal device having a side comprising an optical apparatus and a ferroelectric liquid crystal material adjacent the side, the optical apparatus comprising an electro-optic material having at least one first region having a crystal axis along a first direction, at least one second region having a crystal axis along a second direction, and means for applying an electric field across the at least one first region and the at least one second region, wherein the ferroelectric liquid crystal material cooperates with the optical apparatus to output light having a phase shift generated in accordance with a polarization inversion pattern formed by the first and second regions.

26. A liquid crystal device as claimed in claim 25, wherein the means for applying an electric field is also arranged to apply an electric field to the liquid crystal of the liquid crystal device.

* * * * *